United States Patent [19]

Tani

[11] Patent Number: 4,992,902
[45] Date of Patent: Feb. 12, 1991

[54] CASSETTE DEVICE FOR DEMAGNETIZING THE MAGNETIC HEAD IN A CASSETTE-TYPE RECORDER

[75] Inventor: Sachima Tani, Tokyo, Japan

[73] Assignees: Teac Corporation; Access Corporation, both of Tokyo, Japan

[21] Appl. No.: 322,465

[22] Filed: Mar. 13, 1989

[30] Foreign Application Priority Data

Mar. 22, 1988 [JP] Japan .............................. 63-37523[U]

[51] Int. Cl.⁵ .......................... G11B 5/10; G11B 5/127; G11B 5/41
[52] U.S. Cl. ................................................ 360/128
[58] Field of Search ...................... 360/128, 137, 132

[56] References Cited

FOREIGN PATENT DOCUMENTS 60-195715 10/1985 Japan .................................... 360/128
5810765 7/1989 Japan .

Primary Examiner—John H. Wolff
Assistant Examiner—Alfonso Garcia
Attorney, Agent, or Firm—Finnegan, Henderson, Farabow, Garrett, and Dunner

[57] ABSTRACT

A head demagnetizing device has an overall configuration similar to a standard cassette. Within the case is a demagnetizing electromagnet disposed such that it will be juxtaposed to the head to be demagnetized when the cassette-type device is inserted within a tape recorder. Also included in the case are an electrical system for exciting the electromagnet, a switch for connecting the electromagnet to the circuit for exciting the electromagnet, and an operating member that slides with respect to the electromagnet to activate the switch.

7 Claims, 2 Drawing Sheets

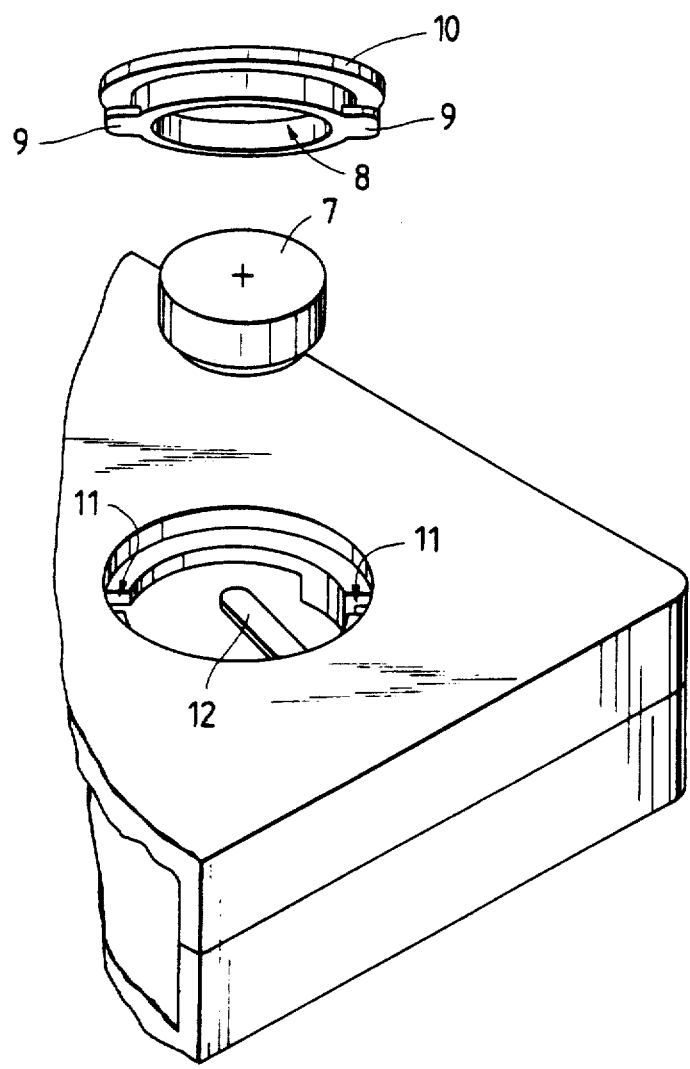

CASSETTE DEVICE FOR DEMAGNETIZING THE MAGNETIC HEAD IN A CASSETTE-TYPE RECORDER

BACKGROUND OF THE INVENTION

This invention relates to a magnetic head-demagnetizing device for demagnetizing a recording and reproducing head of a cassette-type tape recorder.

Japanese patent application Examined Publication No. 10765/83 discloses a magnetic head-demagnetizing device of the cassette-type in which a demagnetizing electromagnet is urged toward and retracted away from a recording and reproducing head. In such a device, the demagnetizing electromagnet is relatively heavy and is moved forward (i.e., toward the head) and backward (away from the head). Thus, a mechanism for moving the demagnetizing electromagnet is rather complicated, and the demagnetizing electromagnet sometimes fails to move smoothly. In addition, the electromagnet may be obliquely retracted and make improper contact with the magnetic head. Further, the conventional device needs a complicated cover corresponding in shape to the demagnetizing electromagnet to prevent the magnetic head from direct contact with the demagnetizing electromagnet.

SUMMARY OF THE INVENTION

The present invention has been made in an effort to solve the above problems, and an object of the invention is to provide a magnetic head-demagnetizing device of the cassette-type which is simple in construction and is reliable in operation.

To achieve these and other objects of the invention, there is provided a device for demagnetizing at least one head in a cassette-type tape recorder. The device includes a case having a configuration adapted to be received into the cassette-type tape recorder. At least one demagnetizing electromagnet is disposed within the case, the electromagnet being juxtaposed to the head when the case is inserted in the recorder. There are means within the case for electrically exciting the electromagnet. The device further includes in the case switch means for electrically connecting the electromagnet to the exciting means, and an operating member having a first extremity adjacent the electromagnet. Insertion of the cassette into the recorder contacts the first extremity to the head and thereby moves the operating member such that the switch is closed and the electromagnet is excited.

BRIEF DESCRIPTION OF THE DRAWINGS

FIG. 3 is an exploded view of the battery receiving means in the cassette of FIG. 1.

DETAILED DESCRIPTION OF THE PREFERRED EMBODIMENT

In accordance with the present invention there is provided a magnetic head demagnetizing device enclosed in a case having a configuration of a standard cassette. There is provided in the case an opening through which the magnetic head protrude where they interface with a demagnetizing electromagnet disposed within the case. Also within the case is a circuit for exciting the demagnetizing electromagnet and a switch for selectively activating this circuit. Further within the case is operating lever interfacing with the head to be demagnetized and the operating lever activates the switch when the lever is moved forward and backward with relation to the opening in the cassette. In this manner, the demagnetizing electromagnet is not brought into contact with the recording and reproducing head that is being demagnetized.

A magnetic head-demagnetizing device of the cassette-type provided in accordance with the present invention will now be described with reference to the drawings.

As here embodied, the magnetic head-demagnetizing device comprises a cassette case composed of upper and lower halves connected together to assume a configuration similar to that of an ordinary magnetic tape cassette. The overall appearance of the cassette-type demagnetizing device is omitted in FIGS. 1-3.

Figure 1:
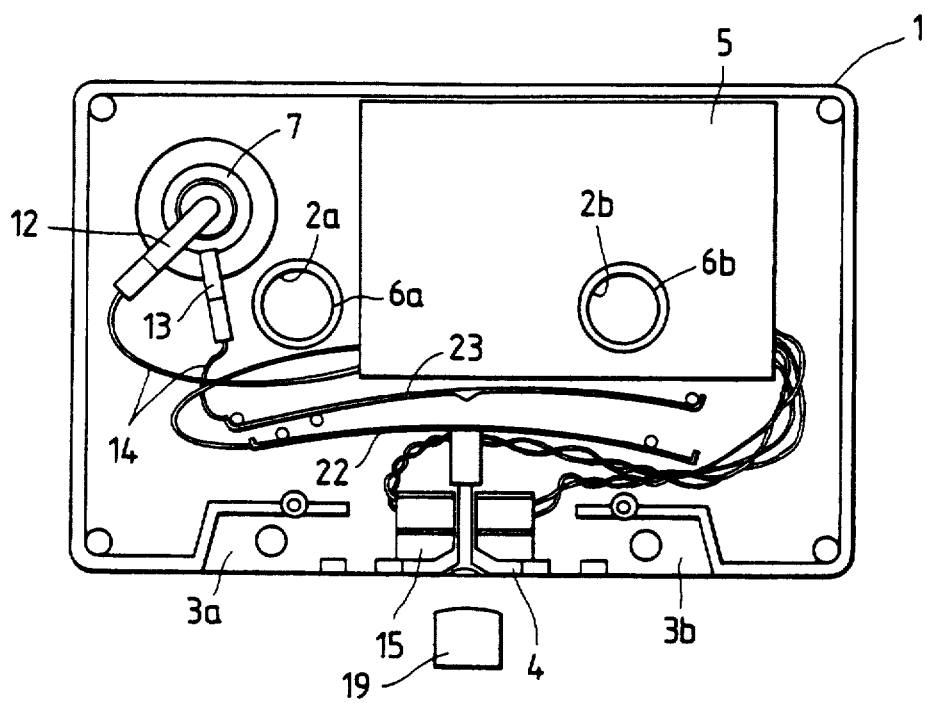
FIG. 1 is a top plan view of the interior of a cassette showing an embodiment of the present invention.

As depicted in FIG. 1, the lower half 1 of the cassette case has reel shaft insertion holes 2a and 2b, pinch roller insertion openings 3a and 3b and a magnetic head insertion opening 4, as does a conventional magnetic tape cassette.

A circuit board 5 is fitted on an annular raised portion 6b serving to define the reel shaft insertion hole 2b. The circuit board includes a drive circuit (not shown) in which the charge of a capacitor is supplied to an oscillator circuit when a switch (later described) is operated, so that the demagnetizing electromagnet is excited by the oscillation output of the oscillator circuit.

As depicted in FIG. 3, a battery 7 for charging the capacitor of the drive circuit is removably mounted on the cassette case by a disc-shaped lid 10 releaseably attached to the cassette case and having a battery-receptive recess 8 and retainer tabs 9. The mechanism for opening and closing the disc-shaped lid 10 is brought into its closed position by fitting the retainer tabs 9 in a pair of notches 11 formed in the lower half 1 of the cassette case and then by moving the lid 10 angularly through about 90 degrees. The lid 10 can be opened by moving the lid in such a manner that the retainer tabs 9 are brought into registry with the notches 11.

The battery 7 has negative and positive terminals 12 and 13, respectively. Each of these terminals is secured to the lower case 1 at the side thereof to which a lead wire 14 is connected. The negative terminal 12 is resilient and urges the battery 7 in a direction tending to eject the battery 7 from the cassette case. This resiliency causes the battery 7 to be ejected from the cassette case when the disc-shaped lid 10 is opened.

Figure 2:
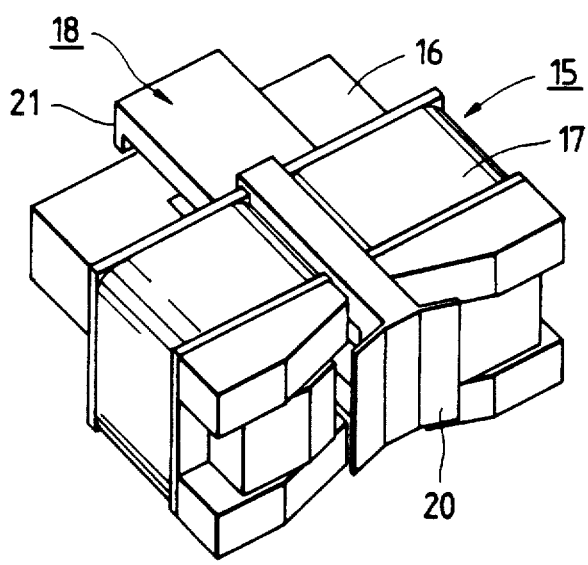
FIG. 2 is a perspective view showing an embodiment of a demagnetizing electromagnet and the operating lever associated therewith.

As shown in FIG. 2, there is included in the case a demagnetizing electromagnet 15 comprising a U-shaped core 16 and a coil 17.

An operating lever 18, preferably of a synthetic resin, straddles a central portion of the demagnetizing electromagnet 15 in such a manner that the operating lever 18 is slidable relative to the electromagnet 15. As here embodied, the plunger-like operating lever 18 has a head engaging portion 20 with which a magnetic head 19 is engaged, and an operating portion 21 for pressing against the switch to activate (i.e., close) the switch. The switch includes elongated resilient elements 22 and 23. In this embodiment, the resilient element 22 is held in engagement with the operating portion 21 of the operating lever 18 to urge the operating lever 18 into its forward position, depicted in FIG. 1. In such a configuration the switch is normally open and the head engaging portion 20 of the operating lever 18 normally projects a distance forward of the electromagnet 15.

In operation, when a cassette tape recorder is put into either its recording or playback condition, with the above magnetic head-demagnetizing device of the cassette-type loaded thereinto, the magnetic head 19 is advanced into engagement with the head engaging portion 20 of the operating lever 18. This urges operating lever 18 against the bias of the resilient element 22. As a result, the resilient element 22 is flexed into contact with the resilient element 23, so that the switch, here including the resilient elements 22 and 23, is closed whereupon the charge of the capacitor produced by the battery 7 is supplied to the oscillator circuit so that the demagnetizing electromagnet 15 is excited by the oscillation output of the oscillator circuit to demagnetize the magnetic head 19.

Because the switch is activated by sliding the operating lever relative to the demagnetizing electromagnet, the operation is reliable and is positively effected. Further, the opposed relation between the demagnetizing electromagnet and the magnetic head is not affected by the sliding movement of the operating lever and therefore is kept stable. Further, the demagnetizing electromagnet is disposed in opposed relation to the magnetic head through the engaging portion of the operating lever, and therefore is not brought into direct contact with the magnetic head. This obviates the need for a complicated cover corresponding in shape to the demagnetizing electromagnet.

The invention has been disclosed in terms of a preferred embodiment. The invention, however, is not limited thereto. The scope of the invention is determined by the appended claims and their equivalents.

I claim:

1. A device for demagnetizing at least one head in a cassette-type tape recorder, said device comprising:

a case having a configuration adapted to be received into said cassette-type tape recorder;

at least one demagnetization electromagnet disposed within and rigidly affixed to said case, said electromagnet being juxtaposed to said head when said case is inserted in said recorder;

means in said case for electrically exciting said electromagnet;

switch means in said case for electrically connecting said electromagnet to said exciting means, said switch means including an operating member, said operating member having a first extremity adjacent said electromagnet and disposed to engage said head whereby insertion of said cassette into said recorder causes said head to contact said first extremity and move said operating member such that said switch is closed and said electromagnet is excited.

2. The device of claim 1, wherein said operating member includes a second extremity, said switch means receiving said second extremity of said operating member to effect closure of said switch.

3. The device of claim 2, wherein said operating member is spring-biased such that said switch means is normally open.

4. The device of claim 3 wherein said operating member is a plunger-like member wherein said first extremity projects a distance forward of said electromagnet.

5. The device of claim 4, wherein said first extremity includes a head engaging portion.

6. The device of claim 5, wherein said head does not contact said electromagnet.

7. The device of claim 1, wherein said switch means includes first and second electrical contact members, said first contact member being elastically deformable, said operating member being disposed to deform said first contact member into contact with said second contact member.

* * * * *